(No Model.)  2 Sheets—Sheet 1.
T. A. EDISON.
AUTOMATIC DETERMINING DEVICE FOR PHONOGRAPHS.
No. 406,572.  Patented July 9, 1889.
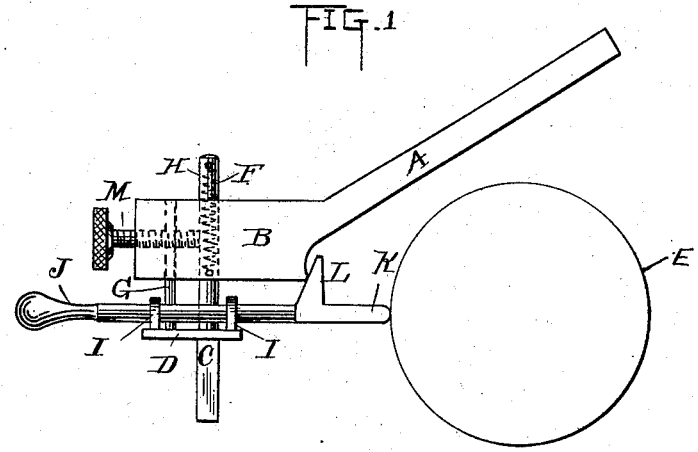
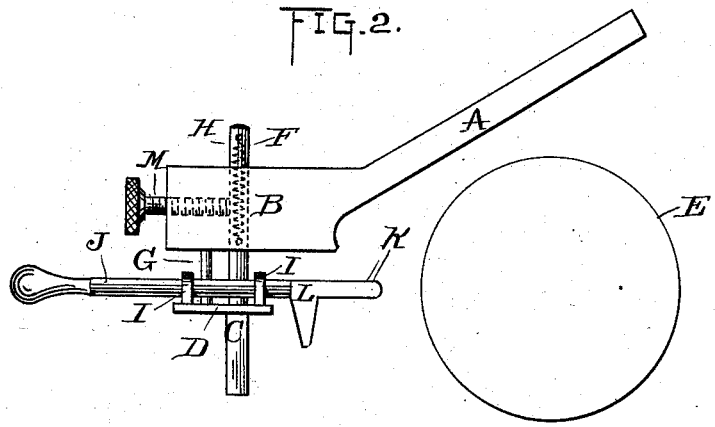

(No Model.) 2 Sheets—Sheet 2.
T. A. EDISON.
AUTOMATIC DETERMINING DEVICE FOR PHONOGRAPHS.
No. 406,572. Patented July 9, 1889.
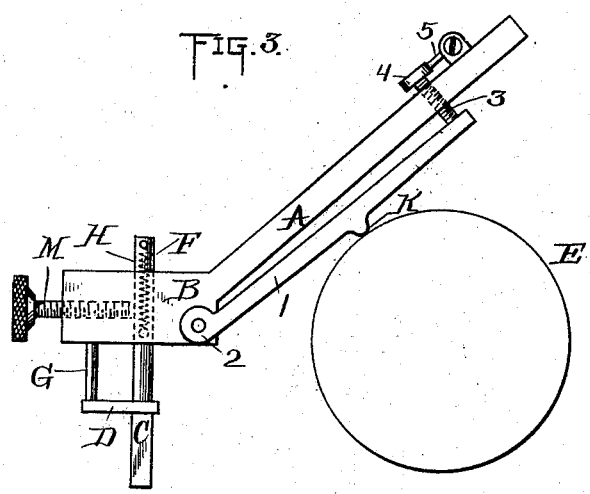
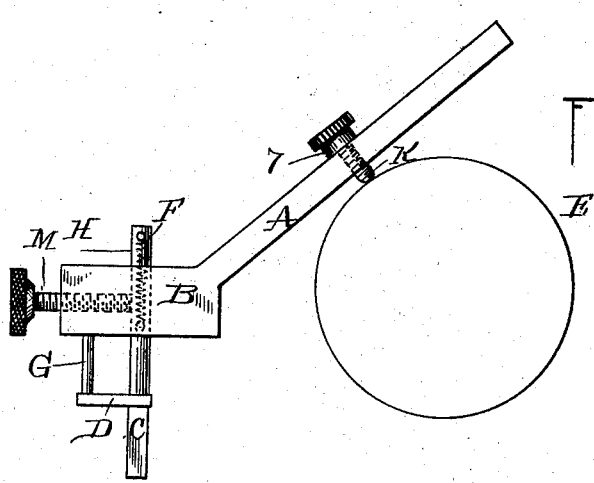
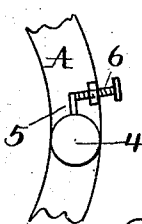
WITNESSES:
INVENTOR
Thomas A. Edison
BY
ATTORNEYS

UNITED STATES PATENT OFFICE.

THOMAS A. EDISON, OF LLEWELLYN PARK, NEW JERSEY.

AUTOMATIC DETERMINING DEVICE FOR PHONOGRAPHS.

SPECIFICATION forming part of Letters Patent No. 406,572, dated July 9, 1889.

Application filed February 11, 1889. Serial No. 299,456. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Automatic Determining Devices for Phonographs, (Case No. 824,) of which the following is a specification.

In my application, (Case No. 818,) Serial No. 296,420, filed January 15, 1889, I have described a preferred form of device for determining automatically the exact position of the recording and reproducing points on the phonogram-cylinder, whether thick or thin, and referred in general terms to other forms of device to accomplish the same purpose which I had tried.

My present invention relates particularly to that form of device referred to in said application having a determining-point adapted to strike the surface of the phonogram-blank as the spectacle-frame is lowered, and provided with a lock to be operated by hand to fix the relation of the parts, and with means for moving the determining-point away from the surface of the wax, to prevent it from wearing such surface, by a movement independent of the locking mechanism; and the invention consists in the several novel devices and combinations of parts, as fully hereinafter explained, and pointed out in the claims.

In the accompanying drawings, forming a part hereof, Figure 1 is a side elevation of a form of automatic determining device embodying my invention, showing the determining-point in contact with the phonogram-blank, with the spectacle-frame locked in the position determined by the determining-point. Fig. 2 shows the same device with the determining-point out of contact with the phonogram-blank, the spectacle-frame being locked in the determined position. Fig. 3 shows a modified form of device in side elevation. Fig. 4 shows a still further modification; and Fig. 5 shows a detail of the device for withdrawing the determining-point of Fig. 3 from contact with the phonogram and a stop for limiting the amount of its movement. This device may be applied also to the device shown in Fig. 4.

The spectacle-frame A, which carries the recorder and reproducer, is similar in construction and mode of operation to the spectacle-frame described in my application above referred to, and comprises two arms, one for each eye of the frame, but one of which B is shown. These arms project forward over the guide-rest C, and each arm is provided with a presser-foot D, which bears upon the guide-rest and supports the spectacle-frame as it moves in a definite relation to the phonogram-blank E.

Referring to Figs. 1 and 2, the presser-foot D is a plate mounted upon the lower end of a bar F, which passes up through arm B, said plate being provided also with a pin G, to prevent its turning on the guide-rest. A spring H is connected to a pin at the upper end of the bar F, and with another pin upon the side of the arm B, and, drawing downwardly upon the bar F, tends to project the presser-foot downwardly to the lowermost limit of its movement. Upon the presser-foot D are also mounted studs I I, supporting the sliding rod J, carrying the determining-point K and piece L, the latter having an incline plane formed upon it whereon a projection of the bar B may ride in the operation of determining the position the spectacle-frame is to occupy.

M is the locking-piece, which is a screw-threaded bolt having a milled head and working in the bar B, so that its end may be brought into contact with the bar F to lock the same when the spectacle-frame in its descent has forced the determining-point into contact with the phonogram-blank.

With the parts in position to begin operations, the downward tension of the spring H will have projected the presser-foot D to its lowermost limit with relation to the bar B, so that the head of the incline plane on the piece L of the sliding bar J will just be in engagement with the projection on the bar B. When the presser-foot comes in contact with the guide-rest, its further movement is arrested and the bar B by gravity descends in opposition to the spring H, thereby acquiring a gentle downward movement, and the projection on it riding on the incline plane of the piece L forces the determining-point forward until it comes in contact with the surface of the phonogram-blank E, when the operator turns the locking-piece M, and thereby locks the spectacle-frame from further descent; or, if the bar J is pushed forward in advance of the position it will occupy when the spectacle-frame is properly adjusted, the point K will strike the surface of the phonogram-blank and be forced back until the projection on the arm B and the incline J are brought together, when the further movement will be arrested. The exact position the recording or reproducing point is to bear in relation to the phonogram-blank being thus determined, the determining-point may be removed from contact with the phonogram-blank. This is done by giving the sliding bar J a partial rotation, so as to withdraw the piece L from contact with the projection on the bar B and then withdrawing the bar J to the position shown in Fig. 2.

In the modifications the same letters of reference indicate parts corresponding to the parts similarly lettered in Figs. 1 and 2.

The locking device of Fig. 3 is similar to the locking device of Figs. 1 and 2. The determining-point here, however, is mounted on a lever 1, pivoted at 2 on the bar B. After the determining-point K has determined the position the recording or reproducing point shall bear to the phonogram-blank the spectacle-frame is locked in that position by the locking mechanism. To withdraw the determining-point from contact with the phonogram-cylinder in this modification, the withdrawing-screw 3 passing through the spectacle-frame is used, one end of which may be connected to the lever 1, bearing the determining-point, and the other end of which is provided with a head 4, having an arm 5 projecting therefrom. On a lug rising from the spectacle-frame is set the stop-screw 6. The degree of movement necessary to remove the determining-point from contact with the phonogram-blank or to return it thereto being slight, by the use of this stopping device it may be readily found.

The locking device of Fig. 4 is also similar to the locking device of Figs. 1 and 2; but here the determining-point K is mounted directly upon the spectacle-frame A, and so that it may be withdrawn from contact with the phonogram-blank after it has performed its determining function and the spectacle-frame has been locked from further descent, I have utilized the point of a set-screw as the determining-point, thereby enabling the operator by simply rotating the set-screw in the proper direction to withdraw the determining-point from contact with the phonogram-blank. A collar 7 under the head of the set-screw acts as a stop. The stop shown in Figs. 3 and 5 may, however, be used in lieu of it.

What I claim is—

1. In a phonograph, the combination, with the recorder or reproducer frame movable toward and away from the phonogram-surface, a guide-rest, and an adjustable presser-foot supporting the said frame from the guide-rest, of a determining-point carried by said frame and making contact with the phonogram-surface, a lock locking the spectacle-frame, operated by hand after the determining-point touches the phonogram-surface, substantially as set forth.

2. In a phonograph, the combination, with the recorder or reproducer frame movable toward and away from the phonogram-surface, a guide-rest, and an adjustable presser-foot supporting the said frame from the guide-rest, of a determining-point carried by said frame and making contact with the phonogram-surface, a lock locking the spectacle-frame, operated by hand after the determining-point touches the phonogram-surface, and mechanism independent of the locking mechanism operating to withdraw the determining-point from contact with the phonogram-blank after the locking of the spectacle-frame is effected, substantially as specified.

3. In a phonograph, the combination, with the recorder or reproducer frame movable toward and away from the phonogram-surface, a guide-rest, and an adjustable presser-foot supporting the said frame from the guide-rest, of a lever and a determining-point carried by said lever and making contact with the phonogram-surface, and a lock locking the spectacle-frame, operated by hand after the determining-point touches the phonogram-surface, substantially as specified.

4. In a phonograph, the combination, with the recorder or reproducer frame movable toward and away from the phonogram-surface, a guide-rest, and an adjustable presser-foot supporting the said frame from the guide-rest, of a lever and a determining-point carried by said lever and making contact with the phonogram-surface, a lock locking the spectacle-frame, operated by hand after the determining-point touches the phonogram-surface, and mechanism, independent of the locking mechanism, operating to withdraw the determining-point from the phonogram after the locking of the spectacle-frame is effected, substantially as specified.

5. In a phonograph, the combination, with the recorder or reproducer frame movable toward and away from the phonogram-surface, a guide-rest, and an adjustable presser-foot supporting the said frame from the guide-rest, of a determining-point carried by said frame and making contact with the phonogram-surface and operated by hand after the operation by hand of the lock locking the spectacle-frame, and said lock locking the spectacle-frame, operated by hand after the determining-point touches the phonogram-surface, substantially as set forth.

This specification signed and witnessed this 1st day of February, 1889.

THOMAS A. EDISON.

Witnesses:
W. PELZER,
D. H. DRISCOLL,